US012454027B2

(12) United States Patent
Funami et al.

(10) Patent No.: US 12,454,027 B2
(45) Date of Patent: Oct. 28, 2025

(54) LASER WELDING METHOD AND APPARATUS

(71) Applicant: Panasonic Intellectual Property Management Co., Ltd., Osaka (JP)

(72) Inventors: Koji Funami, Kyoto (JP); Kazuki Fujiwara, Osaka (JP); Kota Shimizu, Osaka (JP); Kazumichi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 539 days.

(21) Appl. No.: 17/331,972

(22) Filed: May 27, 2021

(65) Prior Publication Data

US 2021/0394305 A1    Dec. 23, 2021

(30) Foreign Application Priority Data

Jun. 19, 2020    (JP) .................. 2020-106450

(51) Int. Cl.
*B23K 26/082*  (2014.01)
*B23K 26/06*  (2014.01)
(Continued)

(52) U.S. Cl.
CPC ........ *B23K 26/082* (2015.10); *B23K 26/0626* (2013.01); *B23K 26/0643* (2013.01);
(Continued)

(58) Field of Classification Search
CPC ............. B23K 26/082; B23K 26/0626; B23K 26/0643; B23K 26/0648; B23K 26/0665;
(Continued)

(56) References Cited

U.S. PATENT DOCUMENTS

2003/0149426 A1*  8/2003  Yee .................. G01J 1/4257
                                                              606/5
2018/0361506 A1   12/2018  Tateyama et al.
(Continued)

FOREIGN PATENT DOCUMENTS

CN        105458492 A  *  4/2016
JP        2000-061672      2/2000
(Continued)

OTHER PUBLICATIONS

English Translation of Chinese Search Report dated Mar. 22, 2025 for the related Chinese Patent Application No. 202110669392.0.

*Primary Examiner* — Brian W Jennison
*Assistant Examiner* — Kristina J Babinski
(74) *Attorney, Agent, or Firm* — Rimon P.C.

(57) ABSTRACT

The present disclosure includes a laser welding method in which a joint surface between a plurality of workpiece members is welded by radiating laser beam LB, and a locus of laser beam LB is controlled so as to perform wobbling scanning Sw by a combination of scanning motion Sa moving along first direction x parallel to the joint surface and swing motion Sb including first swing component Bx along first direction x and second swing component By along second direction y perpendicular to first direction x, the method including a defect determination step of determining occurrence of a welding defect; and an output control step of increasing or decreasing an output of laser beam LB when laser beam LB is radiated again toward the welding defect in a case where the welding defect occurs.

9 Claims, 14 Drawing Sheets

(51) Int. Cl.
*B23K 26/28* (2014.01)
*B23K 26/70* (2014.01)
*B23K 31/12* (2006.01)

(52) U.S. Cl.
CPC ...... *B23K 26/0648* (2013.01); *B23K 26/0665* (2013.01); *B23K 26/28* (2013.01); *B23K 26/705* (2015.10); *B23K 31/125* (2013.01)

(58) Field of Classification Search
CPC .... B23K 26/28; B23K 26/705; B23K 31/125; B23K 2101/04; B23K 2101/36; B23K 26/032; B23K 26/242; B23K 26/282; B23K 26/707; B23K 26/21; B23K 26/064
See application file for complete search history.

(56) References Cited

U.S. PATENT DOCUMENTS

| | | | | |
|---|---|---|---|---|
| 2019/0283175 | A1* | 9/2019 | Sakai | B23K 26/22 |
| 2019/0358735 | A1* | 11/2019 | Kronthaler | B23K 26/0676 |
| 2020/0023461 | A1* | 1/2020 | Galbraith | B23K 26/26 |
| 2020/0147723 | A1* | 5/2020 | Speker | B23K 26/26 |
| 2020/0147725 | A1* | 5/2020 | Gold | B22F 10/28 |

FOREIGN PATENT DOCUMENTS

| | | | |
|---|---|---|---|
| JP | 5224349 B | 7/2013 | |
| JP | 2016-015310 | 1/2016 | |
| JP | 2017-113789 | 6/2017 | |
| JP | 2017113789 A * | 6/2017 | |
| JP | 2018-111120 A | 7/2018 | |
| JP | 2019-005760 | 1/2019 | |
| JP | 2020-044546 | 3/2020 | |
| WO | WO-2020090962 A1 * | 5/2020 | ............. B23K 26/03 |

\* cited by examiner 11  15  18

19

Sa

M

Sw

Sa

FIG. 8A
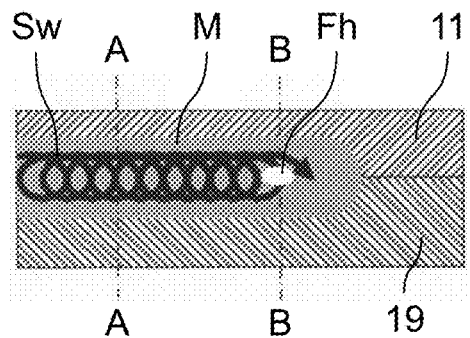
FIG. 8B
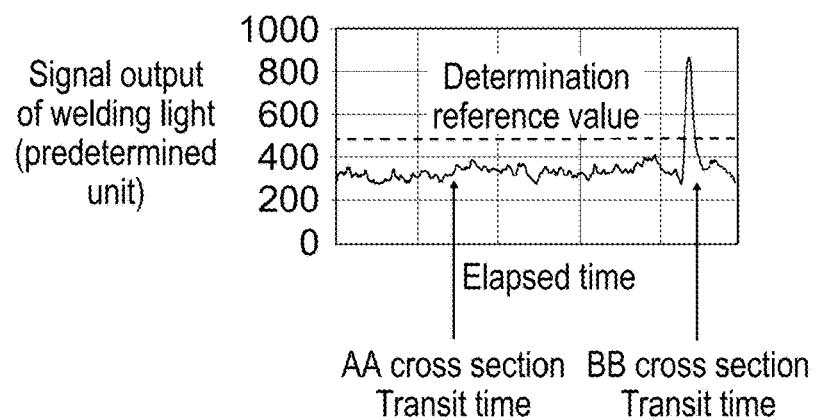
FIG. 8C
FIG. 8D
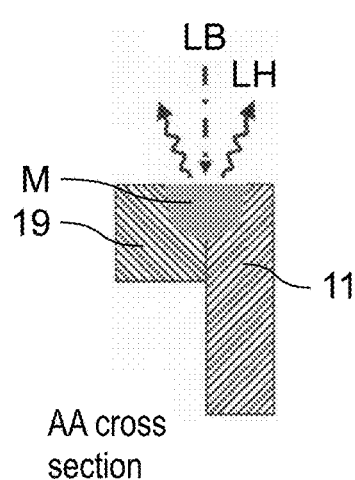
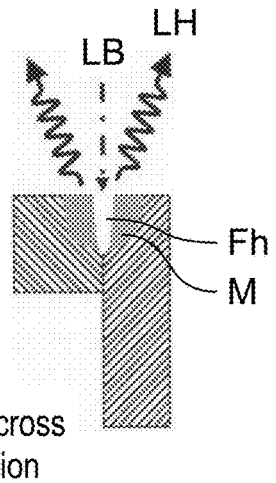

LASER WELDING METHOD AND APPARATUS

BACKGROUND

1. Technical Field

The present disclosure relates to a laser welding method and an apparatus.

2. Description of the Related Art

In a case where laser welding is performed by abutting or superimposing a plurality of workpieces on each other, when a foreign matter or a gap is present at a joining interface, there is a possibility that a welding defect of a hole or an unwelded portion may occur.

As a countermeasure against this, in the related art, occurrence of a welding defect is prevented by performing a second laser irradiation at a same location with just focus, after defocusing and melting a workpiece widely during a first laser irradiation using one laser oscillator (Japanese Patent No. 5224349). In addition, in another technique in the related art, the occurrence of welding defect is prevented by simultaneously irradiating the same welded portion of a workpiece with two laser beams from different directions using two laser oscillators (Japanese Patent Unexamined Publication No. 2019-5760).

SUMMARY

According to an aspect of the present disclosure, there is provided a laser welding method of welding a joint surface between a plurality of workpiece members by emitting a laser beam, a locus of the laser beam being controlled so as to perform wobbling scanning by a combination of (i) a scanning motion moving along a first direction parallel to the joint surface and (ii) a swing motion including a first swing component along the first direction and a second swing component along a second direction perpendicular to the first direction. the method includes a defect determination step of determining occurrence of a welding defect; and an output control step of increasing or decreasing an output of the laser beam to be emitted again toward the welding defect when occurrence of the welding defect is determined in the defect determination step.

In addition, according to another aspect of the present disclosure, there is provided a laser welding apparatus that includes a laser oscillator that supplies a laser beam; a condensing optical system that condenses the laser beam on a joint surface between a plurality of workpiece members; a wobbling scanning optical system that controls a position of the laser beam so that a locus of the laser beam performs wobbling scanning by a combination of a scanning motion moving along a first direction parallel to the joint surface and a swing motion including a first swing component along the first direction and a second swing component along a second direction perpendicular to the first direction; a defect determination unit that determines occurrence of a welding defect; and an output controller that increases or decreases an output of the laser beam when the laser beam is radiated again toward the welding defect in a case where the welding defect occurs.

BRIEF DESCRIPTION OF THE DRAWINGS

FIG. 8A is a top view illustrating a state where a hole occurs.

FIG. 8B is a graph illustrating a temporal change in a signal output of welding light generated from a molten region during the laser welding.

FIG. 8C is a cross-sectional view illustrating thermal radiant light emitting light from the normal molten region.

FIG. 8D is a cross-sectional view illustrating a case where a hole occurs in the molten region.

DETAILED DESCRIPTIONS

In the related art, in order to prevent a welding defect of a hole or an unwelded portion, since one laser oscillator is used to irradiate the laser twice, or two laser oscillators are used to irradiate with two laser beams, approximately twice as much energy as normal is input to a workpiece. Therefore, a thermal load on the workpiece is approximately doubled, and for example, there is a problem that thermal damage is likely to occur in a product in which a weakly heat-resistant component is in the vicinity of a welded portion. In addition, when laser irradiation is performed twice using one laser oscillator and welding is performed, the productivity is twice as low as that of one irradiation, and when two laser oscillators are used to irradiate at the same time, there is also a problem that the equipment cost increases as compared with the one irradiation.

Furthermore, even when the above-described method is adopted, there is a problem that such a welding defect cannot be completely prevented, and even when such a welding defect occurs, the welding defect cannot be detected.

The present disclosure solves the above-described problems in the related art, and an object thereof is to provide a laser welding method and an apparatus capable of efficiently achieving good welding quality.

Hereinafter, exemplary embodiments of the present disclosure will be described in detail with reference to the drawings. The present disclosure is not limited to the following exemplary embodiments. In addition, the present disclosure can be appropriately changed as long as the present disclosure does not deviate from the range in which the effect of the present disclosure is exhibited. Furthermore, the present disclosure can be combined with other exemplary embodiments.

Figure 1:
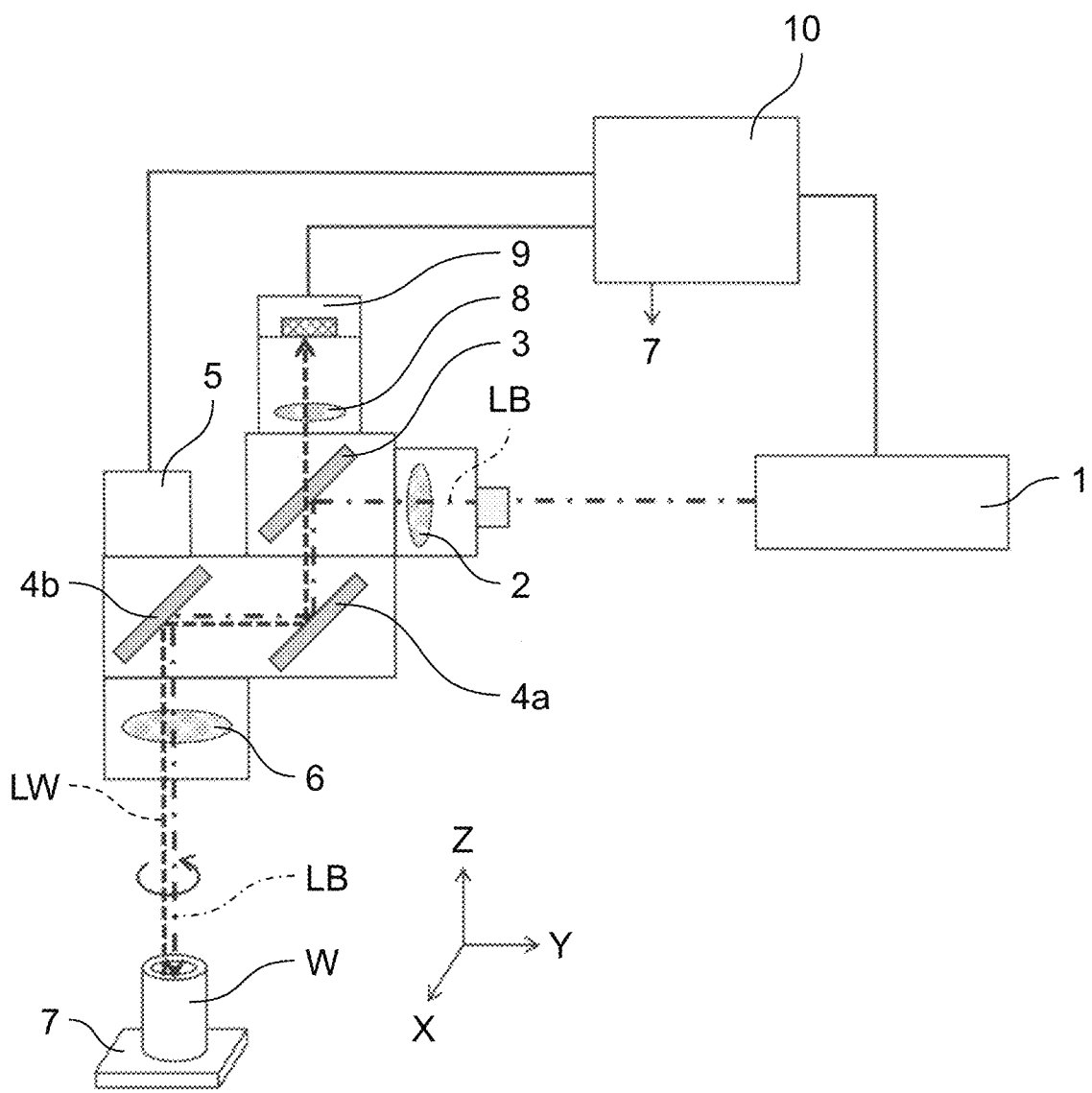
FIG. 1 is a block diagram illustrating a configuration of a laser welding apparatus according to an exemplary embodiment of the present disclosure.

FIG. 1 is a block diagram illustrating a configuration of a laser welding apparatus according to an exemplary embodiment of the present disclosure. The laser welding apparatus is provided with laser oscillator 1, collimated optical system 2, dichroic mirror 3, galvanometer mirrors 4a and 4b, galvanometer mirror controller 5, condensing optical system 6, machining table 7, condensing optical system 8, optical detector 9, overall controller 10, and the like.

Laser oscillator 1 includes, for example, a gas laser such as a carbon dioxide gas laser, a solid-state laser such as a YAG laser, a semiconductor laser, or a fiber laser, and supplies laser beam LB having a predetermined wavelength and a predetermined output. As an example, laser beam LB is a continuous wave (CW) having a wavelength of 1070 nm. Laser oscillator 1 is communicatively connected to overall controller 10, and the output of laser beam LB can be controlled in response to a command from overall controller 10.

Collimated optical system 2 converts laser beam LB supplied from laser oscillator 1 into a parallel beam.

Dichroic mirror 3 has a property of reflecting light in a specific wavelength range and transmitting light in a different wavelength range, and here, dichroic mirror 3 has a function of reflecting laser beam LB and transmitting welding light LW described later.

Each of galvanometer mirror 4a and 4b is provided with a reflection mirror and an angular displacement mechanism that positions the reflection mirror at a desired angle of rotation and/or rotates the reflection mirror at a desired angular velocity. Galvanometer mirror controller 5 is communicatively connected to overall controller 10, and the angle of rotation or angular velocity of each of galvanometer mirrors 4a and 4b is individually controlled in response to a command from overall controller 10. For example, galvanometer mirror 4a has a function of scanning laser beam LB along the X direction illustrated in FIG. 1. For example, galvanometer mirror 4b has a function of scanning laser beam LB along the Y direction illustrated in FIG. 1. By combining both galvanometer mirrors, the locus of laser beam LB can be scanned as two-dimensional coordinates (X, Y) according to the Lissajous figure defined by the following equations (1A) and (1B).

$$X = AX \cdot \cos(\omega X \cdot t) \quad (1A)$$

$$Y = AY \cdot \sin(\omega Y \cdot t + \Delta) \quad (1B)$$

here, AX is the amplitude of X component, ωX is the angular velocity of X component, AY is the amplitude of the Y component, ωY is the angular velocity of the Y component, and Δ is the phase difference between the X component and the Y component. As an example, in a case where AX=AY, ωX=ωY, and Δ=0, it represents a circular motion. As another example, in a case where AX≠AY, ωX=ωY, and Δ=0, it represents an elliptical motion.

Condensing optical system 6 condenses laser beam LB scanned by galvanometer mirrors 4a and 4b to form a light spot having a predetermined shape on the surface of workpiece W. A large amount of heat energy is applied to an irradiation region of the light spot, a portion exceeding the melting point is a molten region, and workpiece W is welded. In the present exemplary embodiment, end face welding of a cylindrical battery is exemplified as workpiece W, and the present disclosure is not limited thereto.

Machining table 7 includes a XYZθ stage, is communicatively connected to overall controller 10, and the three-dimensional position of workpiece W and the angle around the optical axis of laser beam LB can be controlled in response to a command from overall controller 10.

When welding workpiece W, welding light LW (broken line in the figure) is emitted from the molten region of workpiece W. Welding light LW includes thermal radiant light, plasma light, laser reflected light, and the like. A portion of welding light LW passes through condensing optical system 6, galvanometer mirrors 4a and 4b, dichroic mirror 3, and condensing optical system 8 and is incident on optical detector 9. In order to promote understanding, welding light LW is drawn shifted from laser beam LB in FIG. 1, and in reality, both lights are substantially coaxial.

Optical detector 9 includes a photodiode, an A/D converter, and the like, is communicatively connected to overall controller 10, and the detection signal thereof is input to overall controller 10. Optical detector 9 has a function of detecting such welding light LW and converting welding light LW into an electric signal proportional to the intensity of welding light LW.

Overall controller 10 includes a computer having an arithmetic processor, a memory, a mass storage, and the like, performs various operations according to a program set in advance, and for example, oscillation control of laser oscillator 1, laser output control, synchronous control with galvanometer mirror controller 5, signal processing from optical detector 9, and the like are performed.

Figure 2:
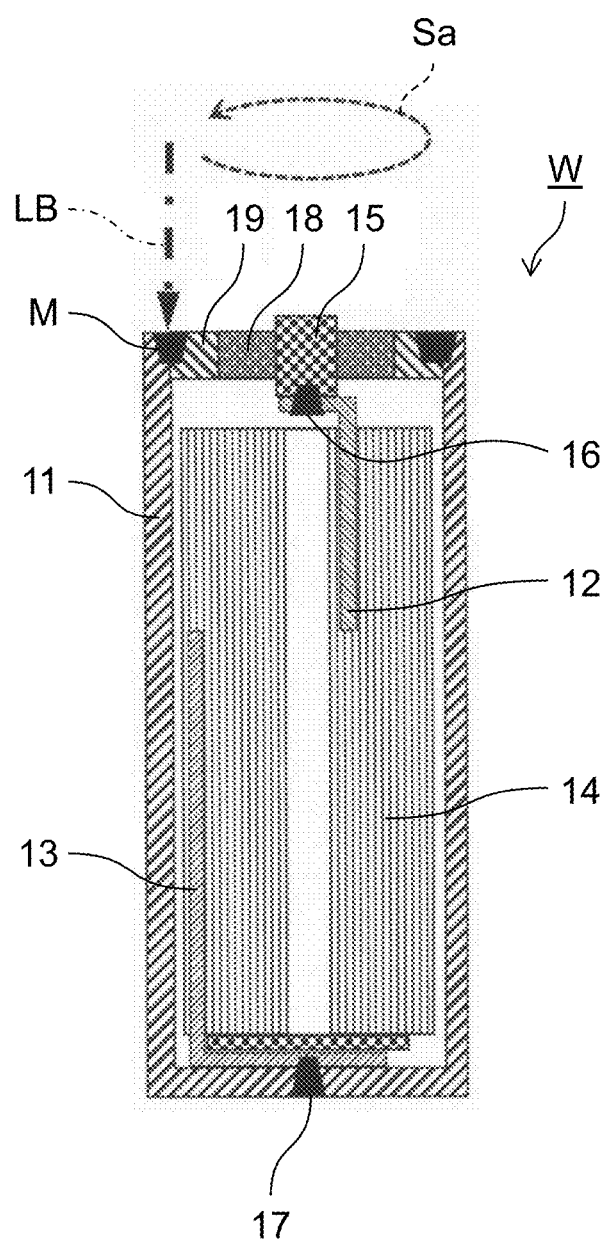
FIG. 2 is a cross-sectional view illustrating an example of a welded portion of a workpiece.

FIG. 2 is a cross-sectional view illustrating an example of a welded portion of workpiece W. Here, a cylindrical battery is exemplified as workpiece W. Inside exterior can 11 of the cylindrical battery, winding body 14 in which a positive electrode sheet, a negative electrode sheet, and a separator interposed therebetween are integrally wound, and an electrolyte solution for a battery reaction are stored. Positive electrode tab 12 is joined to an inner circumference of winding body 14, and negative electrode tab 13 is joined to an outer circumference of winding body 14. Positive electrode tab 12 is connected to positive electrode 15 by connecter 16, and negative electrode tab 13 is connected to exterior can 11 by connecter 17. Sealing plate 19 including positive electrode 15 and insulating resin 18 that electrically insulates and holds positive electrode 15 is inserted into an opening portion at the top of exterior can 11.

In the present exemplary embodiment, as an example, a case where an abutting surface between the outer peripheral surface of sealing plate 19 and the upper end of the inner surface of exterior can 11 is welded by laser beam irradiation is described, and the present disclosure is not limited thereto.

When a circular boundary portion between exterior can 11 and sealing plate 19 is irradiated with laser beam LB, the abutting surface between exterior can 11 and sealing plate 19 is melted, and molten region M is formed. By performing circular scanning motion Sa along the abutting surface of laser beam LB in this state, cylindrical exterior can 11 and circular sealing plate 19 are joined over the entire circumference. In FIG. 2, for simplification, a state where laser beam LB is simply scanned by circular scanning motion Sa is illustrated, and the actual scanning loci are illustrated in FIGS. 3A and 3B.

Figure 3A:
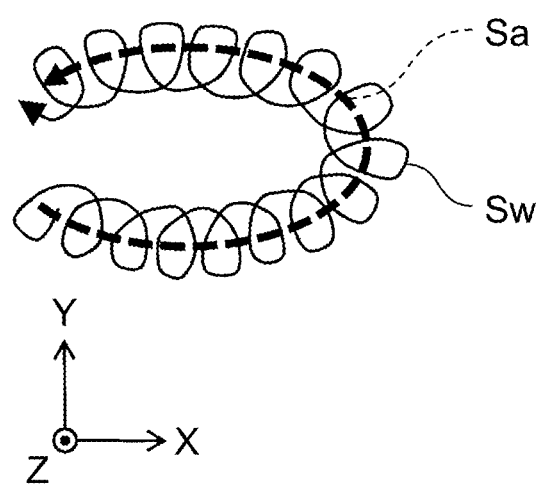
FIG. 3A is an explanatory diagram illustrating an example of wobbling scanning by a combination of circular scanning motion and swing motion.
Figure 3B:
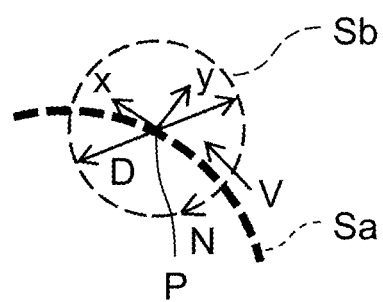
FIG. 3B is an explanatory diagram of swing motion.

FIG. 3A is an explanatory diagram illustrating an example of wobbling scanning Sw by a combination of circular scanning motion Sa and swing motion Sb. FIG. 3B is an explanatory diagram of swing motion Sb. The locus of laser beam LB due to swing motion Sb can be scanned according to the Lissajous figure defined by the following equations (2A) and (2B) as two-dimensional local coordinates (x, y) with a predetermined point of scanning motion Sa as reference point P.

$$x = Bx \cdot \cos(\omega x \cdot t) \quad (2A)$$

$$y = By \cdot \sin(\omega y \cdot t + \delta) \quad (2B)$$

here, Bx is the amplitude of the x component, ωx is the angular velocity of the x component, By is the amplitude of the y component, ωy is the angular velocity of the y component, and δ is the phase difference between the x component and the y component. As an example, in a case where Bx=By, ωx=ωy, and δ=0, it represents a circular motion. As another example, in a case where Bx≠By, ωx=ωy, and δ=0, it represents an elliptical motion.

In this manner, the loci of laser beam LB is controlled to perform wobbling scanning Sw by a combination of scanning motion Sa moving along first direction x parallel to the abutting surface of workpiece W and swing motion Sb including first swing component Bx along first direction x and second swing component By along second direction y perpendicular to first direction x.

In the present exemplary embodiment, an optical system including two galvanometer mirrors 4a and 4b and galvanometer mirror controller 5 and capable of wobbling scanning Sw of laser beam LB is referred to as a wobbling scanning optical system.

Figure 4A:
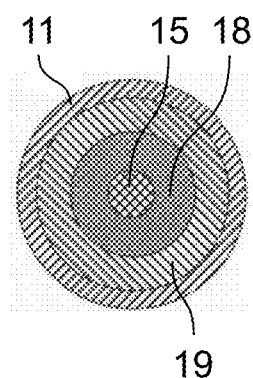
FIG. 4A is an explanatory diagram of wobbling welding on a cylindrical battery.
Figure 4B:
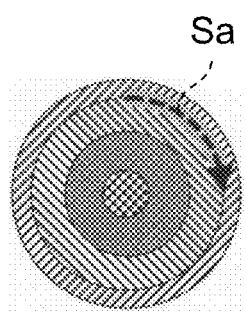
FIG. 4B is an explanatory diagram of the wobbling welding on the cylindrical battery.
Figure 4D:
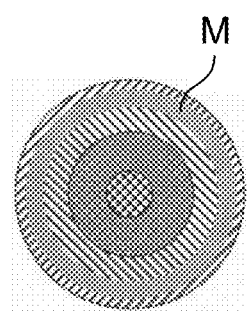
FIG. 4D is an explanatory diagram of the wobbling welding on the cylindrical battery.
Figure 4C:
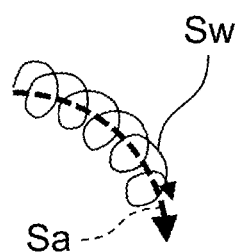
FIG. 4C is an explanatory diagram of the wobbling welding on the cylindrical battery.

Next, the scanning locus when viewed above exterior can 11 of the cylindrical battery, that is, from the laser beam irradiation direction will be described. FIG. 4A illustrates a state before welding, in which sealing plate 19 including positive electrode 15 and insulating resin 18 is inserted into the opening portion of exterior can 11. Next, as illustrated in FIG. 4B, while irradiating the abutting surface between exterior can 11 and sealing plate 19 with laser beam LB, circular scanning motion Sa is performed to join exterior can 11 and sealing plate 19. Here, in reality, as illustrated in FIG. 4C, wobbling scanning Sw is performed in which laser beam LB is moved along the circumference while causing laser beam LB to perform a rotation motion. As a result, as illustrated in FIG. 4D, cylindrical exterior can 11 and circular sealing plate 19 are joined to each other with a wide width along the entire circumference via molten region M.

Figure 5A:
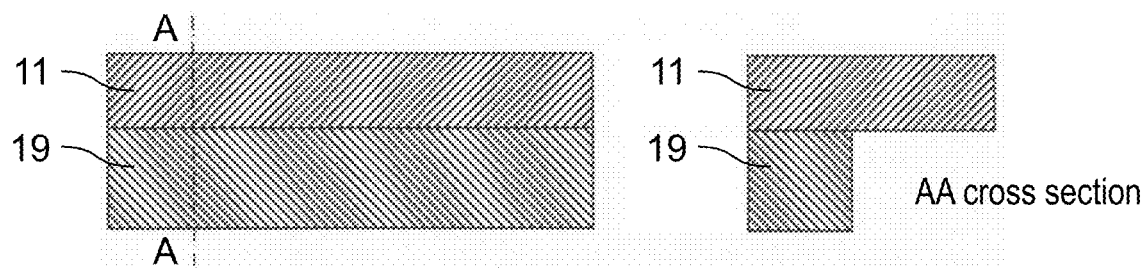
FIG. 5A is a top view and a cross-sectional view illustrating a locus of a laser beam.
Figure 5B:
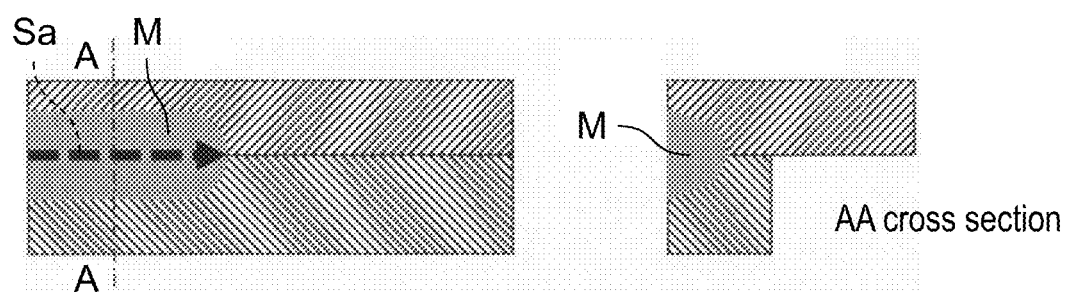
FIG. 5B is a top view and a cross-sectional view illustrating the locus of the laser beam.
Figure 5C:
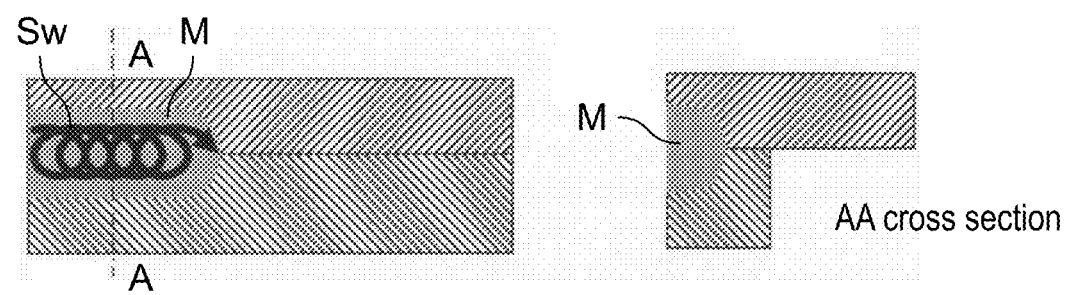
FIG. 5C is a top view and a cross-sectional view illustrating the locus of the laser beam.

Hereinafter, a linear scanning model as illustrated in FIGS. 5A to 5C will be described so that the relationship between the scanning locus of laser beam LB and a joining state can be easily understood. FIG. 5A is a top view illustrating the positional relationship between exterior can 11 and sealing plate 19 before laser welding, and a cross section taken along line A-A. FIG. 5B is a top view and a cross-sectional view illustrating the joining state when laser beam LB is subjected to linear scanning motion Sa at the boundary portion between exterior can 11 and sealing plate 19. FIG. 5C is a top view and a cross-sectional view illustrating a joining state when wobbling scanning Sw scanning linearly along the boundary between exterior can 11 and sealing plate 19 is performed while causing laser beam LB to perform the rotation motion.

By wobbling scanning Sw on laser beam LB, the width of molten region M increases as compared with the linear scanning, and as a result, higher joining strength can be obtained.

Next, with reference to FIGS. 6A to 6C, a welding defect generated when the laser welding is performed with foreign matter Fs interposed between the joining interfaces will be described. Examples of foreign matter Fs at the joining interface include a resin foreign matter generated in the equipment or a product member, and an adhesive material of an electrolytic solution stored inside the cylindrical battery. In addition, examples of the form of the welding defect include a hole, an unwelded portion, and spatter generation. In particular, in the hole and the unwelded defect, as a product of a cylindrical battery, there is a possibility of causing serious defects leading to leakage of the electrolytic solution inside the battery.

Figure 6A:
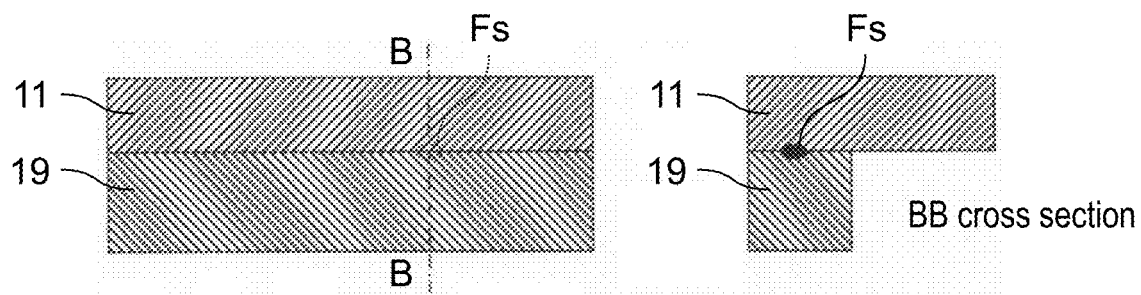
FIG. 6A is a top view and a cross-sectional view illustrating a welding defect generated when laser welding is performed with a linear scanning beam.
Figure 6B:
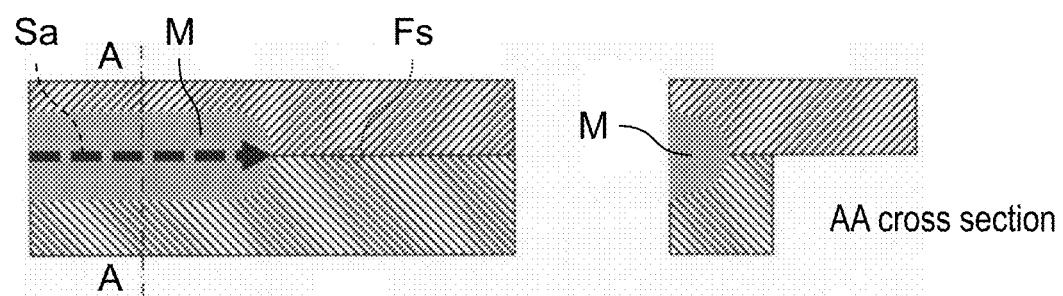
FIG. 6B is a top view and a cross-sectional view illustrating the welding defect generated when the laser welding is performed with the linear scanning beam.
Figure 6C:
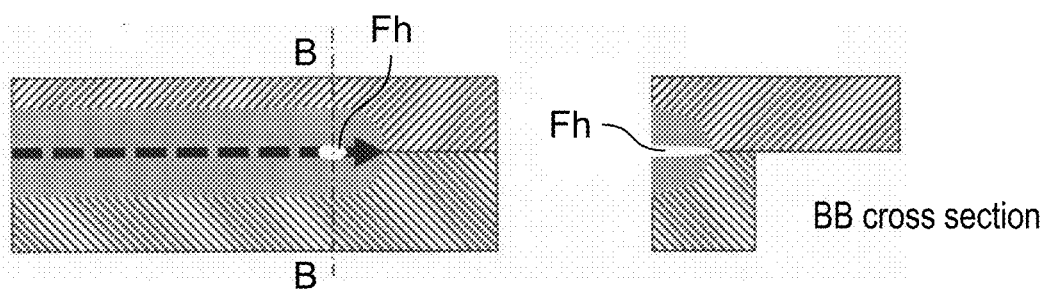
FIG. 6C is a top view and a cross-sectional view illustrating the welding defect generated when the laser welding is performed with the linear scanning beam.

FIGS. 6A to 6C are top views and cross-sectional views illustrating a state where resin foreign matter Fs is interposed between the joining interfaces of the B-B cross section. In this state, when laser beam LB is subjected to scanning motion Sa to perform laser joining, good molten region M as illustrated in the A-A cross section of FIG. 6B is formed in the portion where there is no resin foreign matter Fs. However, when the portion where resin foreign matter Fs is present is irradiated with laser beam 2, resin foreign matter Fs21 rapidly sublimates and explosively expands, the molten portion in the vicinity thereof is also blown to the outside, and hole Fh occurs in molten region M as illustrated in FIG. 6C.

Figure 7A:
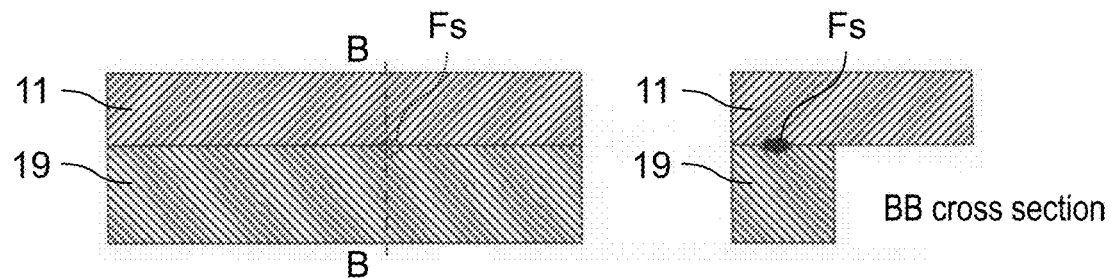
FIG. 7A is a top view and a cross-sectional view illustrating a welding defect generated when laser welding is performed with a wobbling scanning beam.
Figure 7B:
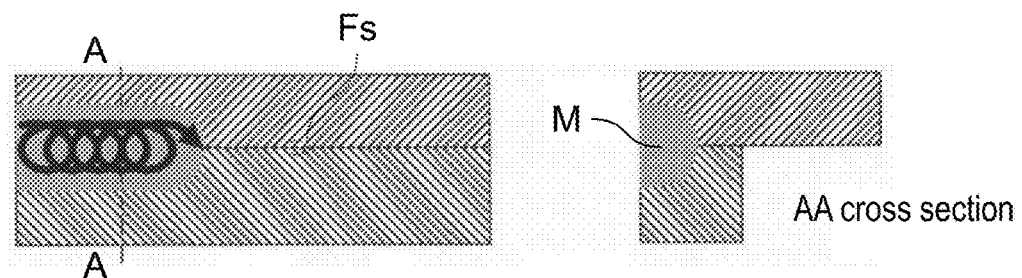
FIG. 7B is a top view and a cross-sectional view illustrating the welding defect generated when the laser welding is performed with the wobbling scanning beam.
Figure 7C:
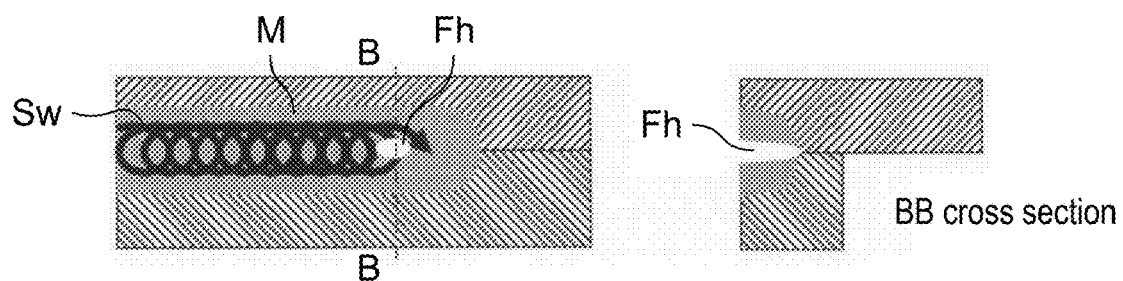
FIG. 7C is a top view and a cross-sectional view illustrating the welding defect generated when the laser welding is performed with the wobbling scanning beam.
Figure 7D:
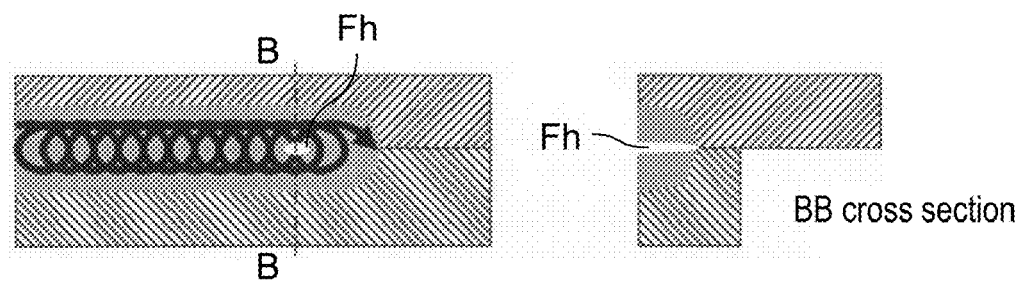
FIG. 7D is a top view and a cross-sectional view illustrating the welding defect generated when the laser welding is performed with the wobbling scanning beam.

FIGS. 7A to 7D are top views and cross-sectional views illustrating a state when laser beam LB is subjected to wobbling scanning Sw. Similar to FIG. 6C, when resin foreign matter Fs is present at the joining interface, as illustrated in FIG. 7C, hole Fh may occur by the first irradiation by laser beam LB. On the other hand, in a case where wobbling scanning Sw is performed, laser beam LB returns to the melted portion once again, and the second irradiation by laser beam LB is performed. Therefore, when hole Fh is small, hole Fh may be backfilled by the second irradiation. However, when hole Fh is large, hole Fh decreases by the second irradiation, and as illustrated in FIG. 7D, hole Fh may remain without being completely backfilled.

Next, a method of detecting the occurrence of hole Fh as a welding defect during the laser welding will be described with reference to FIGS. 8A to 8D. FIG. 8A is a top view illustrating a state when hole Fh occurs. FIG. 8B is a graph illustrating the temporal change in the signal output of welding light LW generated from molten region M during the laser welding in the laser welding apparatus illustrated in FIG. 1.

Here, as welding light LW, thermal radiant light LH having a wavelength in the infrared region, for example, a wavelength of 1300 nm is a monitoring target. The intensity of thermal radiant light LH depends on the temperature of molten region M and the surface area, and a rapid temperature change in molten region M can be detected. As can be found from FIG. 8B, a signal intensity in a former half portion is substantially constant, and a rapidly changing peak intensity occurs in a latter half portion. The constant intensity portion in the former half corresponds to, for example, the signal intensity of thermal radiant light LH emitted from molten region M in the normal molten state, as illustrated in the A-A cross-sectional view of FIG. 8C. On the other hand, the rapid peak intensity portion in the latter half corresponds to the occurrence of hole Fh, as illustrated in the B-B cross-sectional view of FIG. 8D. In a case where hole Fh occurs in molten region M, thermal radiant light LH abnormally increases due to the sublimation of resin foreign matter Fs, the ejection of the molten portion to the outside, and the like. Therefore, by measuring and analyzing the signal intensity of the thermal radiant light LH, it is possible to determine the occurrence of the welding defect such as hole Fh. For example, as an example of a method of determining whether welding is normal or abnormal, a welding defect can be determined by performing a preliminary experiment in advance to establish a relationship between the state of hole Fh and the signal intensity of thermal radiant light LH, setting a certain determination reference value, and then determining whether or not the actually measured signal intensity includes a peak intensity exceeding the determination reference value.

As another example, the plasma light in the visible light region emitted during the laser welding may be a monitoring target as welding light LW. When such hole Fh occurs, an abnormal plasma light occurs from molten region M, so that such plasma light can be used as a detection signal.

Furthermore, as another example, the reflected light reflected by laser beam LB in molten region M may be a monitoring target as welding light LW. When hole Fh occurs in molten region M, the molten shape is changed. Therefore, it is possible to determine the occurrence of hole Fh by analyzing the change in signal intensity of the reflected light of the laser beam.

Next, a method of eliminating generated hole Fh defect and joining a good product, specifically, a method of backfilling generated hole Fh with a molten metal to repair the hole and joining a good product, will be described with reference to FIGS. 9A to 9F.

Figure 9A:
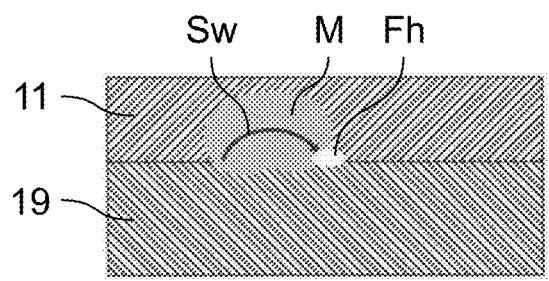
FIG. 9A is a top view illustrating a positional relationship between a locus of the wobbling scanning beam and a foreign matter.

FIG. 9A illustrates a state where the locus of laser beam LB performing wobbling scanning Sw irradiates foreign matter Fs existing at the joining interface to generate hole Fh. FIG. 9B illustrates a state where wobbling scanning Sw is subsequently advanced by half a cycle. During this period, it is noted that laser beam LB returns in a direction (left direction in FIG. 9B) opposite to a direction (right direction in FIG. 9B) welded so far on the machined surface of the workpiece (here, exterior can 11 and sealing plate 19). FIG. 9C illustrates a state where wobbling scanning Sw is further advanced by half a cycle from FIG. 9B. The locus of laser beam LB travels forward (right direction in FIG. 9C) from hole Fh generated in FIG. 9A. The wobbling welding in the present exemplary embodiment is a method of continuously welding with laser beam LB by moving laser beam LB in the welding direction while causing laser beam LB to perform the rotation motion centered on a reference point of scanning motion Sa, and the locus of laser beam LB is wobbling scanning Sw.

As parameters defining wobbling scanning Sw, as illustrated in FIGS. 9B and 9C, rotation diameter D [mm] of laser beam LB, rotation speed N [rps (rotation/sec)], and scanning speed V [mm/s] of scanning motion Sa as a whole can be used. As illustrated in FIG. 9C, wobbling pitch P [mm] in which the reference point of swing motion Sb moves in one cycle in wobbling scanning Sw is represented by the following equation (3).

$$P \text{ [mm]} = V \text{ [mm/s]}/N \text{ [rps]} \quad (3)$$

Figure 9D:
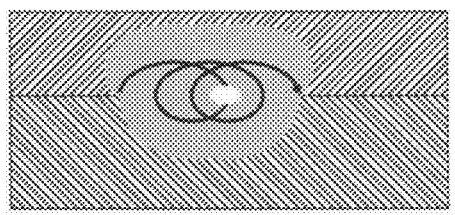
FIG. 9D is a top view illustrating a positional relationship between the locus of the wobbling scanning beam and the foreign matter.
Figure 9B:
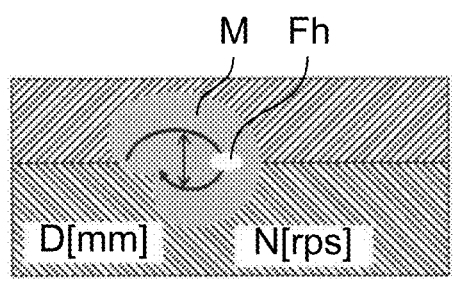
FIG. 9B is a top view illustrating a positional relationship between the locus of the wobbling scanning beam and the foreign matter.
Figure 9E:
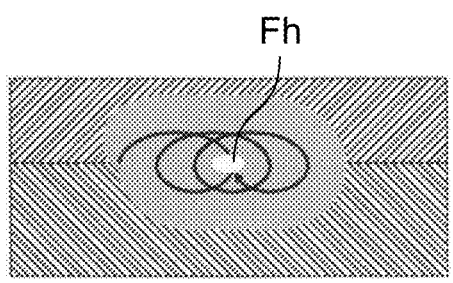
FIG. 9E is a top view illustrating a positional relationship between the locus of the wobbling scanning beam and the foreign matter.
Figure 9C:
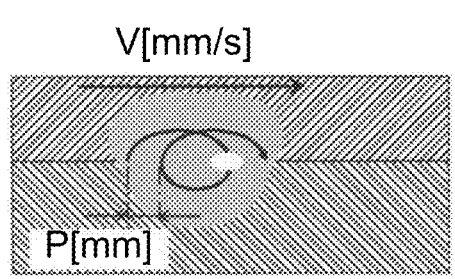
FIG. 9C is a top view illustrating a positional relationship between the locus of the wobbling scanning beam and the foreign matter.

FIG. 9D illustrates a state where laser beam LB is further advanced by one cycle from FIG. 9C. FIG. 9E illustrates a state where laser beam LB is further advanced by half a cycle from FIG. 9D. At this time, the second irradiation of laser beam LB is performed toward hole Fh. By increasing the output of laser beam LB from the standard output before this second irradiation, it is possible to melt more metal around hole Fh generated in FIG. 9A. As a result, the molten metal is poured into hole Fh portion, and hole Fh can be filled and repaired. After the second irradiation, the output of laser beam LB is reduced to the standard output again.

Figure 9F:
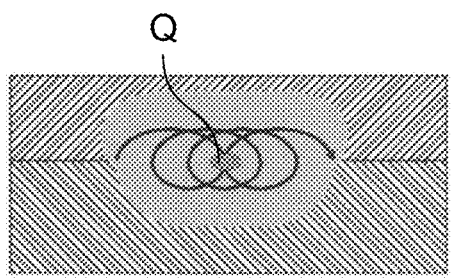
FIG. 9F is a top view illustrating a positional relationship between the locus of the wobbling scanning beam and the foreign matter.

FIG. 9F illustrates a state where laser beam LB is further advanced by half a cycle from FIG. 9E. Hole Fh is eliminated, and hole repairer Q is formed instead.

In a case where hole Fh is repaired by laser re-irradiation, the repair can be verified by performing a preliminary experiment in advance whether hole Fh is filled how much the laser output is increased to irradiate. In a case where the laser welding is performed on the actual product, when hole Fh actually occurs during the wobbling welding, it is possible to perform laser irradiation so that hole Fh is filled by controlling the laser output verified in the preliminary experiment.

Figure 10A:
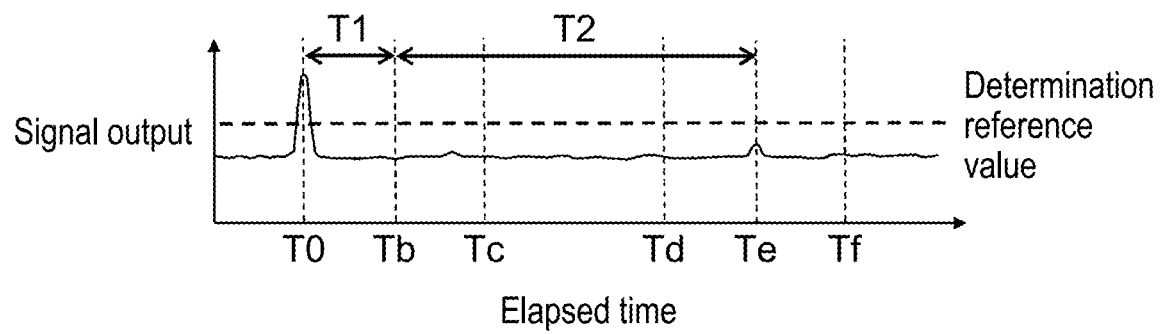
FIG. 10A is a graph illustrating a temporal change in a welding light signal during wobbling welding.
Figure 10B:
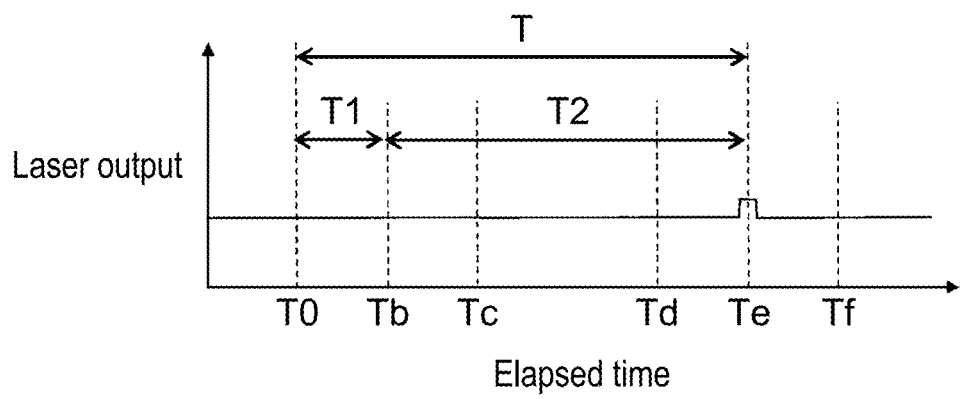
FIG. 10B is a graph illustrating a change in intensity of a laser output for repairing the hole.

Next, the timing for increasing or decreasing the laser output will be described with reference to FIG. 10. FIG. 10A is a graph illustrating the temporal change in the welding light signal during the wobbling welding illustrated in FIGS. 9A to 9F. FIG. 10B is a graph illustrating a change in intensity of the laser output for repairing hole Fh. The display period of the graph is from before hole Fh occurs in the wobbling welding to the time when hole Fh actually occurs and hole Fh is filled to be good welding.

As illustrated in FIG. 10A, it can be observed that a peak intensity occurs in the signal intensity of the welding light signal at time T0 and hole Fh occurs. That is, time T0 at which the peak intensity occurs in FIG. 10A corresponds to the state of FIG. 9A. In addition, each of the states of FIGS. 9B to 9F corresponds to times Tb to Tf in FIG. 10A. For example, the time when laser beam LB returns for half a cycle by wobbling scanning Sw is Tb, and the time when laser beam LB returns to the position of hole Fh and the laser output is increased is Te. At this time Te, although the signal output in FIG. 10A is slightly increased by the increase in the laser output, the signal output is clearly different from the peak intensity when hole Fh occurs at time T0, and a slight increase in signal intensity at time Te is not mistaken for the peak intensity when hole Fh occurs. In addition, the increase in the signal intensity at time Te is equal to or less than the determination reference value of the welding abnormality obtained in the preliminary verification.

A time interval T1 [s] (=Tb−T0) between time T0 at which hole Fh occurs and time Tb at which laser beam LB returns for half a cycle by wobbling scanning Sw is represented by the following equation (4).

$$T1\ [s]=(1/2)/N\ [rps] \quad (4)$$

Furthermore, the time interval between time Tb when laser beam LB returns for half a cycle by wobbling scanning Sw and central time Te when laser beam 2 returns to the position of hole Fh and the laser output is increased is defined as T2. The number of times K that laser beam LB rotates around the reference point during wobbling scanning Sw during this time interval T2 is represented by the following equation (5).

$$K\ [Rotation]=ROUND(D\ [mm]/P\ [mm]) \quad (5)$$

here, ROUND ( ) is a function that rounds the numbers in a parenthesis to an integer after the decimal point. For example, ROUND (2.4) is an integer 2 and ROUND (4.6) is an integer 5.

It is noted here that laser beam LB always returns to the vicinity of hole Fh by wobbling scanning Sw, so that the number of rotations K of laser beam LB is an integer. Therefore, it is necessary to round off the calculation result by the calculation formula D [mm]/P [mm] to convert the calculation result into an integer.

In addition, time T2 [s] during which laser beam LB is K [rotated] is represented by the following equation (6).

$$T2\ [s]=K\ [rotation]/N\ [rps] \quad (6)$$

Furthermore, according to the equations (3), (5) and (6), time T2 [s] during which laser beam LB is K [rotated] is represented by the following equation (7) using rotation diameter D [mm] of laser beam LB, rotation speed N [rps], and scanning speed V [mm/s] as a whole.

$$T2\ [s]=ROUND(D\ [mm] \times N\ [rps]/V\ [mm/s])/N\ [rps] \quad (7)$$

A time interval T from time T0 when hole Fh occurs to central time Te when laser beam LB returns to the position of hole Fh and the laser output is increased is the sum of T1 and T2, and is represented by the following equation (8) using rotation diameter D [mm] of laser beam LB, rotation speed N [rps], and scanning speed V [mm/s] as a whole from the equations (4) and (7).

$$T\ [s]=T1+T2=(1/2)/N\ [rps]+ROUND(D\ [mm] \times N\ [rps]/V\ [mm/s])/N\ [rps] \quad (8)$$

Next, specifically, from which stage the laser output may be gradually increased and by which stage the laser output may be decreased to the standard condition will be described with reference to FIGS. 11A to 11E. FIGS. 11A to 11E illustrate a state when FIGS. 9D to 9F are further divided by every quarter cycles and scanned. In addition, the output change in the welding light signal and the change in the laser output at this time are illustrated in FIGS. 12A and 12B. In addition, each of FIGS. 11A to 11E corresponds to times Ta to Te of FIG. 12B. In the case of FIG. 10B described above, the laser output is rapidly increased or decreased before and after central time Te. In this case, hole Fh is filled, and spatter may occur or the molten state may be unstable due to a sudden increase in laser output. In order to secure a stable welding state even when the laser output is changed, it is preferable to gradually increase the laser output and gradually decrease the laser output.

Figure 11A:
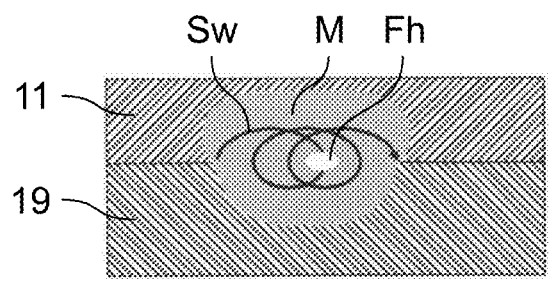
FIG. 11A is a top view illustrating a locus of a wobbling scanning beam for filling the hole.
Figure 11D:
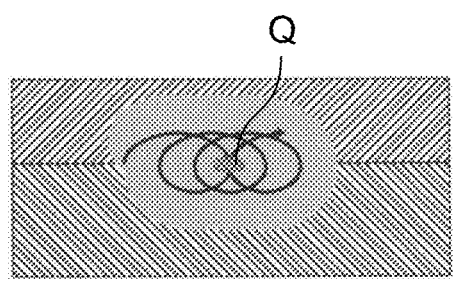
FIG. 11D is a top view illustrating a locus of the wobbling scanning beam for filling the hole.
Figure 11B:
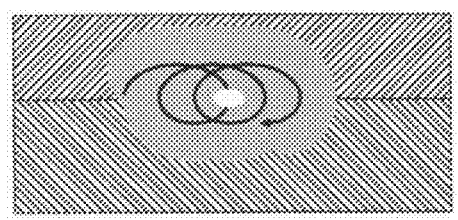
FIG. 11B is a top view illustrating a locus of the wobbling scanning beam for filling the hole.
Figure 11E:
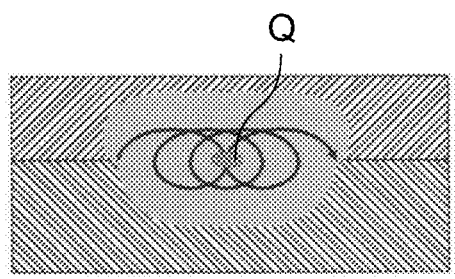
FIG. 11E is a top view illustrating a locus of the wobbling scanning beam for filling the hole.
Figure 11C:
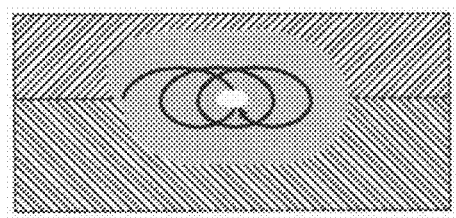
FIG. 11C is a top view illustrating a locus of the wobbling scanning beam for filling the hole.
Figure 12A:
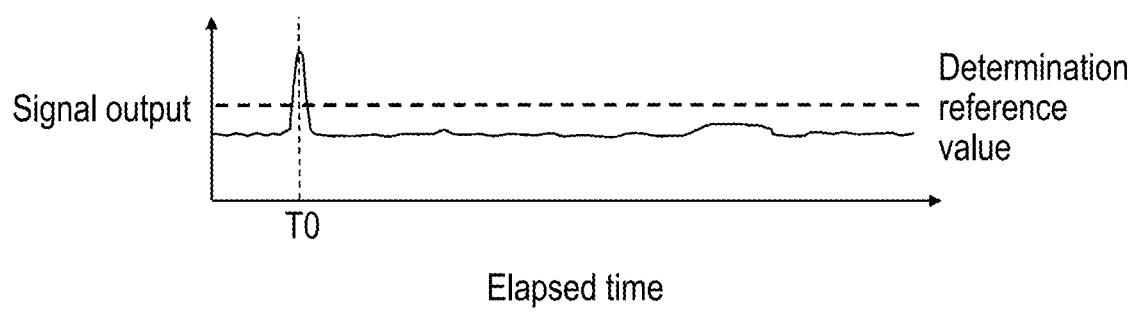
FIG. 12A is a graph illustrating a change in an output of a welding light signal and a change in the laser output.
Figure 12B:
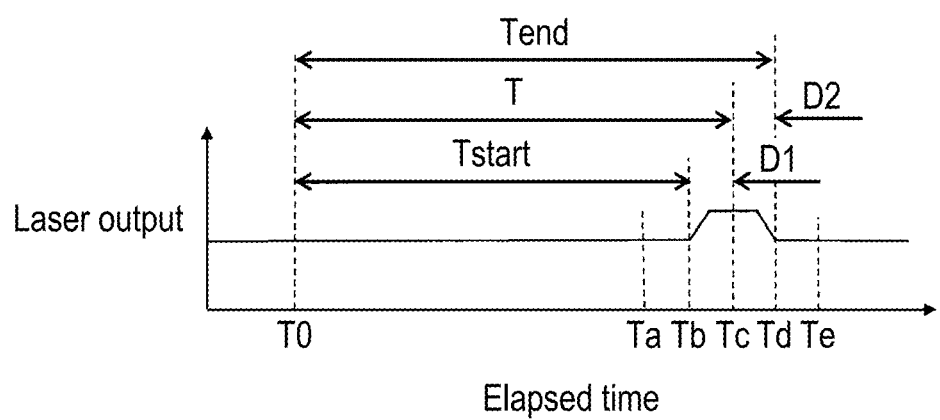
FIG. 12B is a graph illustrating a change in the output of the welding light signal and a change in the laser output.

Specifically, it is necessary that the laser output starts to increase at the timing before laser beam LB returns (FIG. 11B), and increases to the desired laser output at least at the timing of aiming at the position of hole Fh (FIG. 11C). On the contrary, even when the laser output is increased at the timing before laser beam 2 returns (FIG. 11B), it does not contribute much to the repair of hole Fh.

Furthermore, it is preferable that the laser output is gradually reduced after laser beam LB is passed through hole Fh, and the laser output is returned to the standard laser output at the timing (FIG. 11D) before entering the new joining portion. On the contrary, even when the laser output continues to increase after passing through hole Fh, it does not contribute much to the repair of hole Fh.

The change in the laser output at this time is illustrated in FIG. 12B. The time when the increase in the laser output starts is Tb, and the time when the laser output decreases and returns to the original standard output is Td. The time interval from increase start time Tb of the laser output to time Tc aiming at the position of hole Fh is defined as D1, and the time interval from time Tc aiming at the position of hole Fh to time Td when the laser output returns to the standard output is defined as D2. In addition, based on time T0 at which hole Fh occurs, a time interval from time T0 to the increase start time Tb of the laser output is defined as a Tstart, and time interval from time T0 to time Td when the laser output returns to the standard output is defined as a Tend.

In the present exemplary embodiment, as an example, time intervals D1 and D2 are both set to a quarter cycle and are represented by the following equation (9).

$$D1\ [s]=D2\ [s]=(1/4)/N[rps] \quad (9)$$

In addition, increase start time Tstart of the laser output and time Tend for returning the laser output to the original standard output with reference to time T0 are represented by the following equations (10) and (11) using rotation diameter D [mm] of laser beam LB, rotation speed N [rps], and scanning speed V [mm/s] as a whole from the equations (8) and (9).

$$T\text{start [s]}=(\text{¼})/N \text{ [rps]}+\text{ROUND}(D \text{ [mm]} \times N \text{ [rps]}/V \text{ [mm/s]})/N \text{ [rps]} \quad (10)$$

$$T\text{end [s]}=(\text{¾})/N \text{ [rps]}+\text{ROUND}(D \text{ [mm]} \times N \text{ [rps]}/V \text{ [mm/s]})/N \text{ [rps]} \quad (11)$$

Next, how much the laser output is increased to irradiate the position portion of hole Fh to fill hole Fh will be described with reference to FIGS. 13A to 13C and FIGS. 14A and 14B.

Figure 13A:
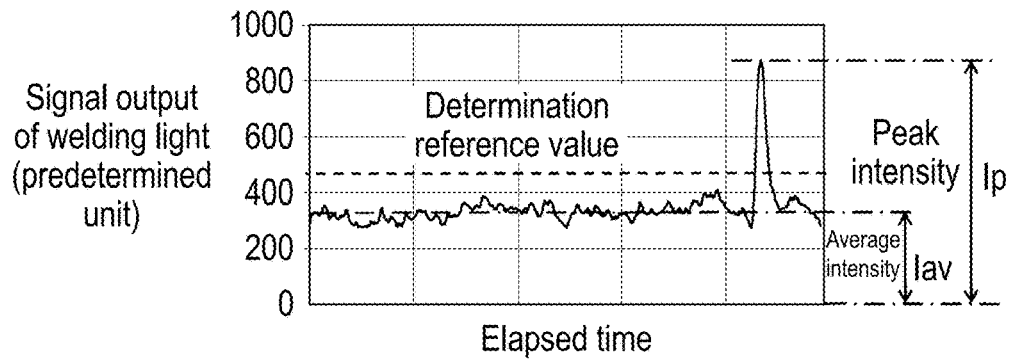
FIG. 13A is a graph illustrating an output waveform of the welding light signal when a hole occurs during the wobbling welding.

FIG. 13A is a graph illustrating an output waveform of the welding light signal when hole Fh occurs during the wobbling welding. In this figure, the signal output that appears when hole Fh occurs is defined as peak intensity Ip, and the average value of the welding light signals when hole Fh does not occur is defined as average intensity Iav. Regarding peak intensity Ip, the absolute intensity has no meaning, and the relative intensity to average intensity Iav is significant information. That is, relative peak intensity Rp (=Ip/Iav), which is how many times peak intensity Ip is average intensity Iav, is important.

Figure 13B:
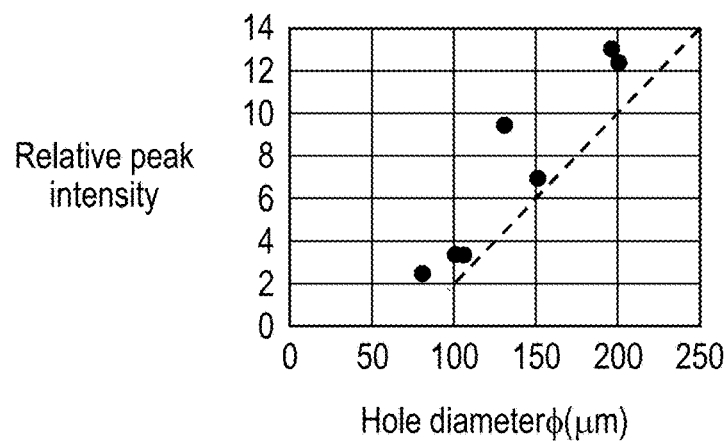
FIG. 13B is a graph illustrating an example of a relationship between a relative peak intensity when a hole occurs and a hole diameter of the actually generated hole.

FIG. 13B is a graph illustrating an example of the relationship between relative peak intensity Rp when hole Fh occurs and hole diameter p of actually generated hole Fh. As can be found from this figure, the larger hole diameter p, the larger relative peak intensity Rp. That is, it can be estimated that the larger relative peak intensity Rp, the larger hole Fh occurs. In addition, in this case, it is considered that hole Fh having a diameter of φ50 μm or less does not occur, and minute hole Fh having a diameter of φ50 μm or less does not occur due to the surface tension of the molten region.

Furthermore, relative peak intensity Rp when hole Fh occurs is "2" or more. Therefore, for example, it is preferable to set a numerical value smaller than the relative peak intensity "2", for example, "1.5" as the determination reference value of hole Fh, and when the determination reference value is exceeded, it can be determined that there is a possibility that hole Fh occurs. On the other hand, the signal intensity when hole Fh does not occur is not equal to or greater than 1.5 times average intensity Iav.

Figure 13C:
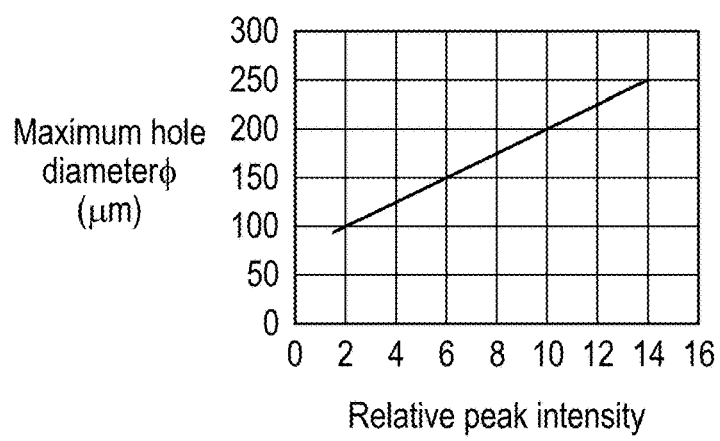
FIG. 13C is a graph displayed with a vertical axis and a horizontal axis of the graph of FIG. 13B interchanged.

In FIG. 13B, the dotted line is a linear approximation of the vicinity of the lower limit of the relative peak intensity with respect to the hole diameter. FIG. 13C is a graph displayed with a vertical axis and a horizontal axis of this dotted line graph interchanged, and illustrates the maximum hole diameter with respect to the measured relative peak intensity.

Figure 14A:
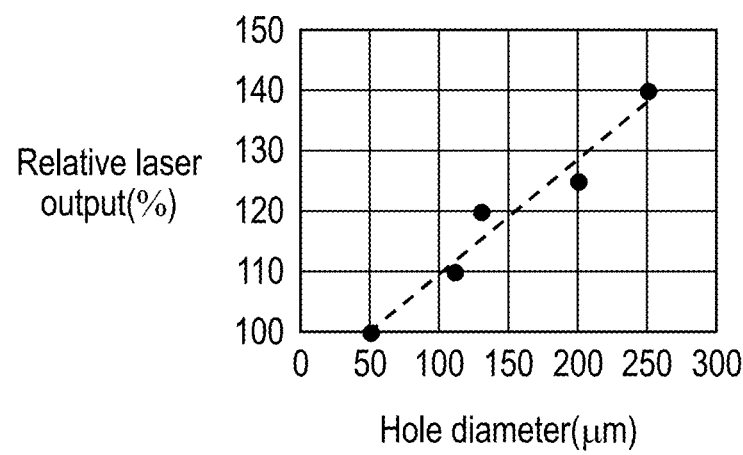
FIG. 14A is a graph illustrating a relationship between the hole diameter of the hole and a relative laser output required to fill the hole.

Next, in a case where hole Fh occurs in the molten region, FIG. 14A is an example of a graph illustrating how much output the laser irradiation is performed to fill hole Fh. The vertical axis represents the relative laser output, which represents the laser output relative to the standard laser output, in units of "%". For example, the laser output when the relative laser output is 100% is the same as the standard laser output. In addition, the laser output when the relative laser output is 120% is 20% larger than the standard laser output. The horizontal axis indicates the diameter of hole Fh.

Referring to FIG. 14A, for example, when the hole diameter is small and 50 μm, the hole is filled even with a standard laser output. However, when the hole diameter increases and reaches 200 μm, 125% of the standard laser output (25% increase in output) is required.

Figure 14B:
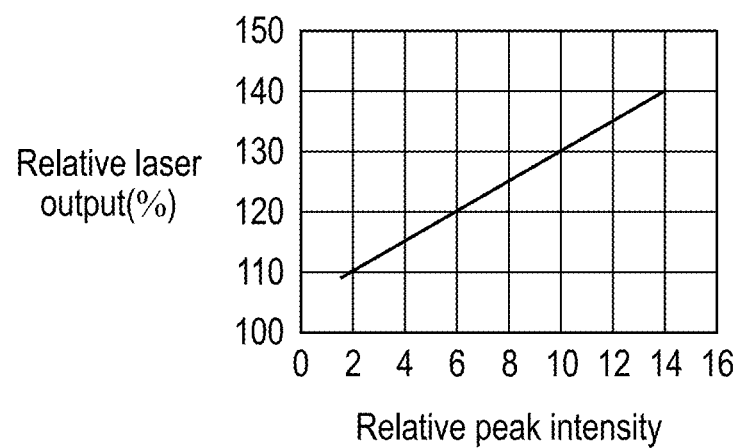
FIG. 14B is a graph illustrating a relationship between a relative peak intensity of a measured welding light signal and the relative laser output required to fill the hole.

FIG. 14B is obtained from the combination of FIGS. 13C and 14A, and is an example of a graph illustrating how much laser output is irradiated to measured relative peak intensity Ip to fill hole Fh. For example, when relative peak intensity Rp when hole Fh occurs is "2", it can be found that the laser output may be radiated at 110% of the standard laser output. More specifically, when relative peak intensity Rp is "2", as illustrated in FIG. 13C, the hole diameter of hole Fh that seems to be generated is estimated to be 100 μm at the maximum. Furthermore, from FIG. 14A, the required laser output is 110% when the hole diameter is 100 μm, which is the same as the laser output condition obtained from FIG. 14B.

That is, it is preferable to increase the rate of increase in the laser output in proportion to a magnitude of relative peak intensity Rp when hole Fh occurs. Specifically, as illustrated in the graph of FIG. 14B obtained in the preliminary verification, it is possible to determine the laser output by using the correlation graph of relative peak intensity Ip and the laser output required for filling the hole.

EXAMPLE

Next, as a specific welding example, the effectiveness of the present disclosure was verified in the full-circled welding with exterior can 11 of the cylindrical battery and sealing plate 19 described above.

As a laser welding method in the related art, laser scanning was performed simply in a circumferential shape at a laser output of 1000 W and a scanning speed of 500 mm/s to perform the full-circled welding. At this time, hole Fh was generated with a probability of 20% (that is, holes were generated in 2 workpieces out of 10 workpieces). The cause of this hole Fh is due to a joining interfacial foreign matter, an electrolytic solution residual, a gap, and the like.

On the other hand, in the laser welding method according to the present disclosure, the laser output 1000 W and scanning speed V: 500 mm/s were the same, and the wobbling scanning conditions were rotation diameter D: 0.5 mm and rotation number N: 2000 rps.

In addition, at the same time, in a case where the emission signal intensity of the welding light generated during laser welding was measured, and peak intensity Ip in which hole Fh seems to be generated, relative peak intensity Rp with respect to average intensity Iav during the normal welding was calculated, and when it was equal to or higher than a predetermined determination reference value (1.5 in this case), it was determined that a welding defect was generated.

In addition, since the time from the time when hole Fh occurs until laser beam LB returns to the position of hole Fh is a rotation number of 2000 rpm, a rotation diameter of 0.5 mm, and a welding speed of 500 mm/s, the time is 1.25 ms from the equation (8). That is, it can be found that laser beam LB returns 1.25 ms after it is found that hole Fh occurs.

Furthermore, for measured relative peak intensity Rp, the relative laser output required for filling the holes was calculated using the graph of FIG. 14A, converted to the actual laser output, increased, and laser irradiation was performed. As a result, good welding without hole Fh could be realized in all 10 workpieces, and the effectiveness of the present disclosure was verified.

As described above, according to an aspect of the present disclosure, good welding quality can be efficiently achieved. For example, according to the present exemplary embodiment, in a case where laser welding is performed by wobbling scanning in which the rotation motion is performed on the welding surface while moving laser beam LB along the joining interface, it is determined that a welding defect such as a hole occurs by detecting the welding light generated during the laser welding, the timing at which the locus of laser beam LB returns to the position where the welding defect occurs is calculated by the wobbling scanning, and at that timing, the laser output is increased and laser re-irradiation is performed. Therefore, the welding defect such as a hole can be efficiently repaired. Furthermore, since good welding quality can be obtained by only one wobbling scanning, no thermal load is applied and no thermal damage occurs as in the related art. In addition, since only one wobbling scanning is required using one laser oscillator, high productivity can be obtained and equipment cost can be reduced.

In the present exemplary embodiment, butt welding of two workpieces is described as an example, and the present disclosure can also be applied to lap welding or fillet welding of two workpieces. In addition, the present disclosure is not limited to two workpieces, and the present disclosure can be applied to various laser welding of three or more workpieces.

In addition, in the present exemplary embodiment, a hole is exemplified as a welding defect, and the present disclosure can also be applied to a welding defect such as an unwelded portion or spatter generation.

In addition, in the present exemplary embodiment, although the case where scanning motion Sa is a circular motion or a linear motion and swing motion Sb is a circular motion is illustrated, as an alternative, scanning motion Sa may be an elliptical motion, a rectangular motion, or any other motion indicating a Lissajous figure, and swing motion Sb may be an elliptical motion, a rectangular motion, or any other motion indicating a Lissajous figure.

As described above, according to the present disclosure, it is possible to prevent welding defects of the hole or an unwelded portion that occur when laser welding is performed by abutting or superimposing a plurality of workpieces. The present disclosure can be applied to, for example, the full-circled welding of an exterior can of a cylindrical battery or a square battery and a sealing plate, and a high-quality battery without a hole or an unwelded portion can be realized.

The present disclosure is significantly useful in industry in that good welding quality can be efficiently achieved.

What is claimed is:

1. A laser welding method of welding a joint surface between a plurality of workpiece members, the method comprising:
   emitting a laser beam to the joint surface, wherein a locus of the laser beam is controlled so as to perform wobbling scanning by a combination of (i) a scanning motion moving along a first direction parallel to the joint surface and (ii) a swing motion including a first swing component along the first direction and a second swing component along a second direction perpendicular to the first direction;
   detecting welding light generated from a molten region of the joint surface;
   determining occurrence of a welding defect based on an intensity of a detection signal of the welding light; and
   adjusting an output power of the laser beam, and emitting the laser beam with the adjusted output power again to the welding defect after occurrence of the welding defect is determined to remove the welding defect,
   wherein the output power of the laser beam is increased when the welding defect is irradiated with the laser beam.

2. The laser welding method of claim 1,
   wherein the determining of the occurrence of the welding defect is made when the detection signal is larger than a determination reference value set in advance.

3. The laser welding method of claim 1,
   wherein the method comprises:
   identifying a defective portion where the welding defect occurs; and
   increasing the output power of the laser beam before the laser beam passes through the defective portion again, and decreasing after the laser beam passes through the defective portion.

4. The laser welding method of claim 3,
   wherein the method comprises increasing the output power of the laser beam in proportion to a magnitude of a relative peak intensity obtained by dividing a peak intensity of a detection signal of the welding light generated when the welding defect occurs by an average intensity of a detection signal of the welding light when the welding defect does not occur.

5. The laser welding method of claim 3,
   wherein the scanning motion has a scanning speed V,
   the swing motion is a circular motion having a rotation diameter D and a rotation speed N centered on a reference point of the scanning motion, and
   a timing at which the laser beam passes through the defective portion again is calculated using the rotation diameter D, the rotation speed N, and the scanning speed V.

6. The laser welding method of claim 5,
   wherein a time interval T [s] from a time when the welding defect occurs to a central time when the output of the laser beam is increasing when the laser beam passes through a position where the welding defect occurs again satisfies the following equation:

$T\ [s]=T1+T2=(1/2)/N\ [rps]+\text{ROUND}(D\ [mm]\times N\ [rps]/V\ [mm/s])/N\ [rps]$ here, ROUND ( ) is a function that rounds numbers in a parenthesis to an integer after a decimal point, D is the rotation diameter [mm] of the laser beam, N is the rotation speed [rps] of the laser beam, and V is the scanning speed [mm/s] of the laser beam.

7. The laser welding method of claim 6,
   wherein a time Tstart from the time when the welding defect occurs to a start of increasing a laser output and a time Tend until the laser output is restored satisfy the following equations:

$T\text{start}\ [s]=(1/4)/N\ [rps]+\text{ROUND}(D\ [mm]\times N\ [rps]/V\ [mm/s])/N\ [rps]$ $T\text{end}\ [s]=(3/4)/N\ [rps]+\text{ROUND}(D\ [mm]\times N\ [rps]/V\ [mm/s])/N\ [rps]$ 8. A laser welding apparatus comprising:
   a laser oscillator that supplies a laser beam;
   a condensing optical system that condenses the laser beam on a joint surface between a plurality of workpiece members;
   a wobbling scanning optical system that controls a position of the laser beam so that a locus of the laser beam performs wobbling scanning by a combination of a scanning motion moving along a first direction parallel to the joint surface and a swing motion including a first swing component along the first direction and a second swing component along a second direction perpendicular to the first direction;

a welding light detector that detects welding light generated from a molten region of the joint surface;

a signal processor that determines occurrence of a welding defect based on an intensity of a detection signal of the welding light; and an output controller that adjusts an output power of the laser beam so as to increase when the laser beam is radiated again to the welding defect in a case where the welding defect occurs to remove the welding defect.

9. The laser welding method of claim 1, wherein the welding defect is a hole and re-applying the laser beam to the welding defect fills the hole to remove the welding defect.

* * * * *